United States Patent Office 3,401,442
Patented Sept. 17, 1968

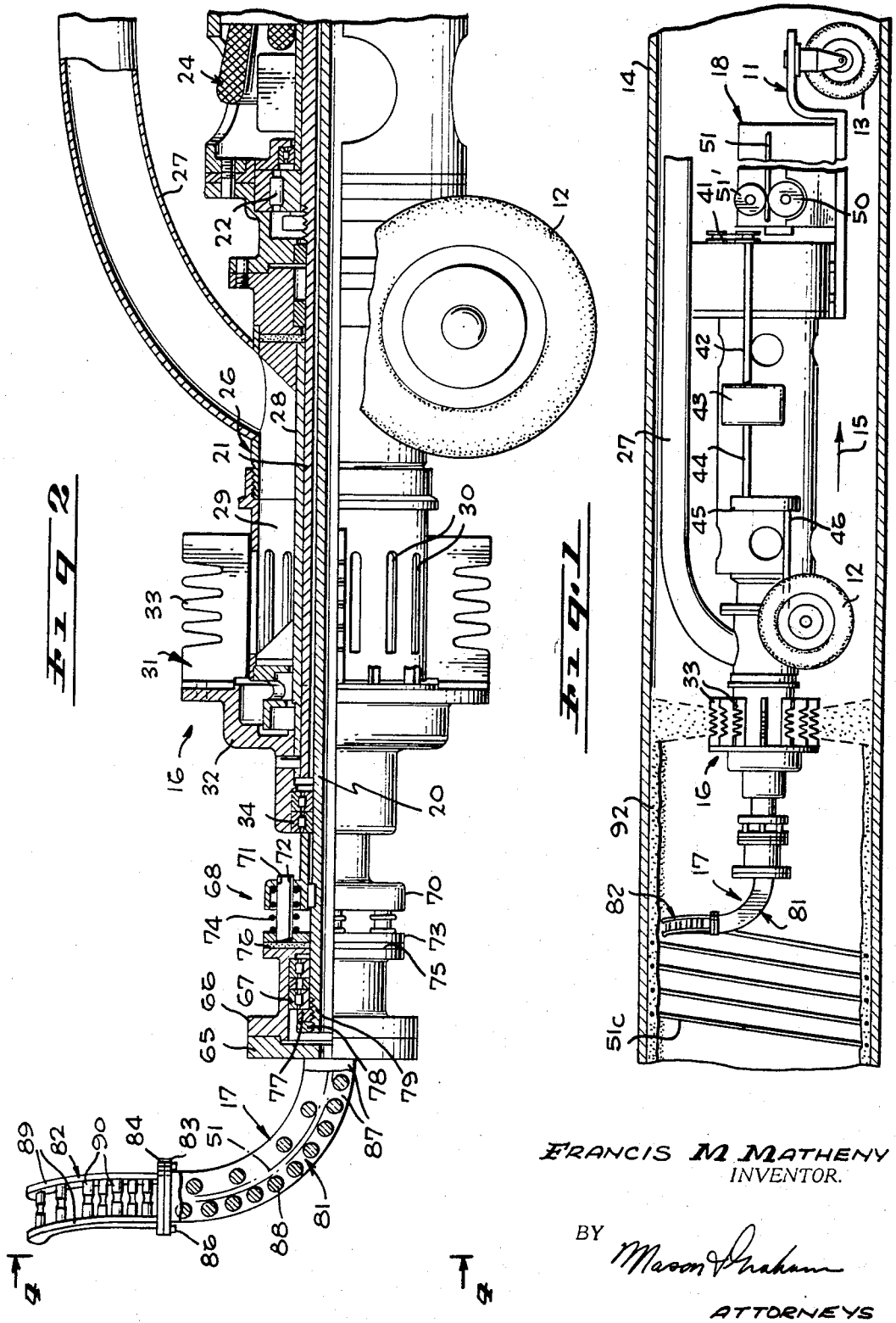

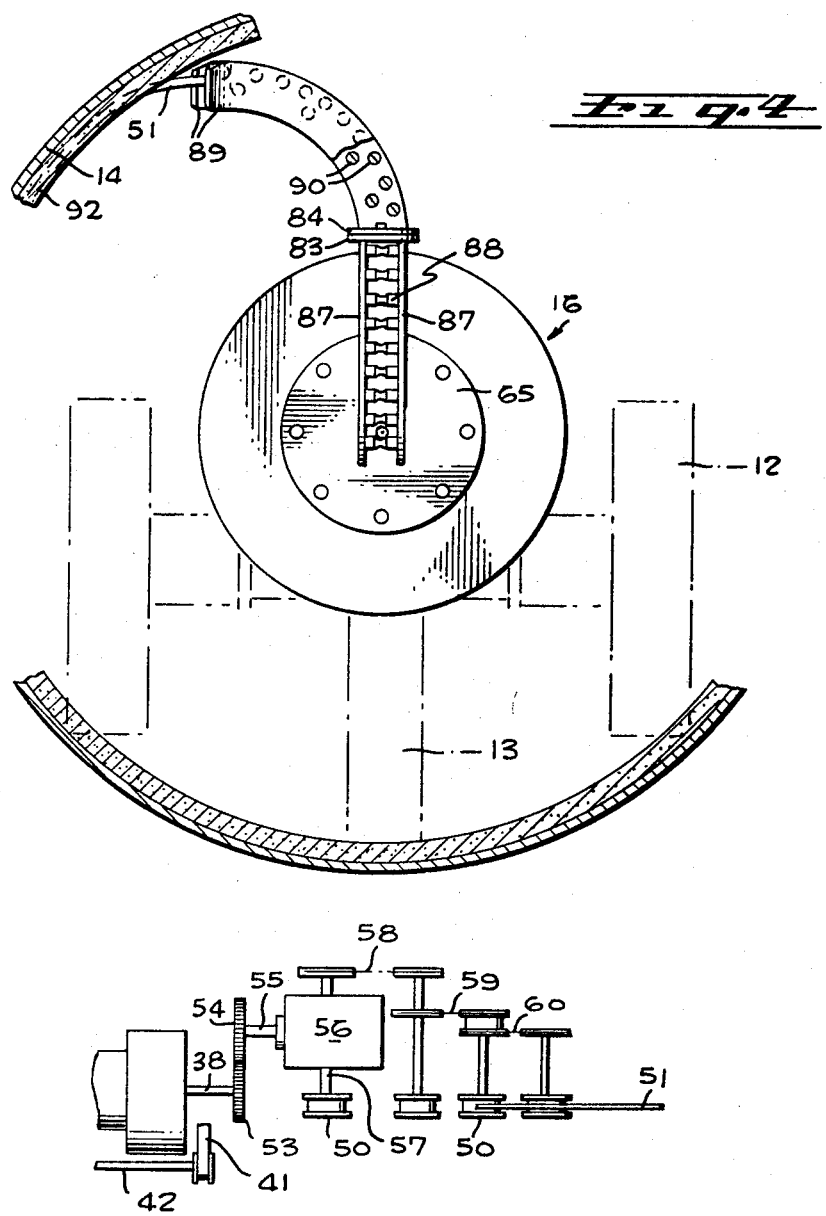

3,401,442
PIPELINE LINING AND REINFORCEMENT
MACHINE
Francis M. Matheny, 5175 E. Elmwood Ave.,
Lynwood, Calif. 90262
Filed Oct. 21, 1965, Ser. No. 500,400
10 Claims. (Cl. 29—208)

ABSTRACT OF THE DISCLOSURE

The application discloses a machine with a powered rotary head for dispensing mortar to line a pipeline and with powered means for feeding a wire reinforcement rod rearwardly through the machine to a dispensing head behind the mortar head which coils the wire rod inside the pipeline in the mortar coating.

---

This invention has to do with means for lining pipelines in place with a coating of cement mortar and also with means for providing a reinforcement therein in the form of a wire rod coiled helically inside the pipeline.

Heretofore it has been necessary to first coat the inside of the pipe with a nonmetallic lining and allow this coating to become sufficiently dry and hard before a machine could be passed through the pipeline to coil the wire rod reinforcement therein. Subsequently another machine was passed through the pipe to cover the wire rod reinforcement with cement mortar.

An object of the present invention is to provide novel apparatus which enables the placement of a first coating of cement mortar or the like in the pipeline and the placement of the wire rod reinforcement therein in one operation thereby effecting a considerable saving in time and money.

More particularly it is an object to provide a new and improved machine by means of which it is possible to embed and helically coil a reinforcement wire rod in a freshly placed cement mortar lining.

Another object of the invention is to provide a novel machine for the application of a coating of mortar inside a pipeline and for the immediate coiling and embedding of a reinforcement wire rod in the coating.

These and other objects will be apparent from the drawings and the following description. Referring to the drawings:

FIG. 1 is a side elevational view of a machine embodying the invention shown within a section of pipeline;

FIG. 2 is an enlarged view, partly in elevation and partly in section, of the rear end portion of the machine, but on a larger scale;

FIG. 4 is an end elevational view of the rear end of the machine, the view being indicated by lines 4—4 of FIG. 2; and FIG. 5 is a diagrammatic view of a portion of the wire drive means.

Figure 3:
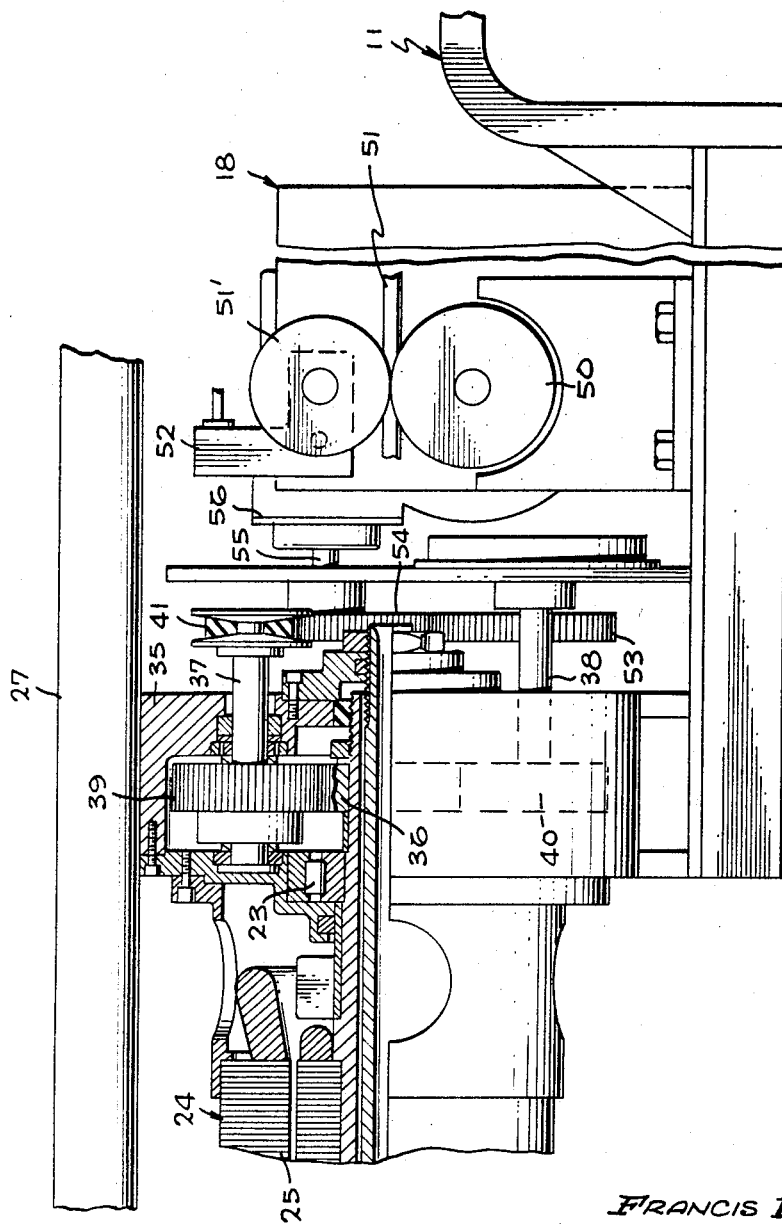
FIG. 3 is a view similar to FIG. 2, but showing part of the front end portion of the machine.

More particularly describing the invention, in general the machine includes a carriage 11 provided with two rear or main wheels 12 which are motor-driven and a central forward wheel 13. The machine is thus adapted to traverse a pipeline 14 by moving in the direction of the arrow 15.

The machine further includes, generally, a mortar dispensing means 16, a wire rod dispensing head 17 and motor-driven wire rod feed means 18 located at the front end.

Describing the machine more in detail, I provide a stationary hollow shaft or tube 20 which extends longitudinally of the machine and normally has its axis coincident with the axis of the pipeline. In machines of this type the wheels are normally made vertically adjustable so that the machine can be centered in the pipeline; however, the means for accomplishing this are not shown since it forms no part of the invention. Surrounding the tube is a hollow drive shaft 21 which is supported for rotation in main bearings 22 and 23. An electric motor 24 surrounds the shaft 21 with the rotor 25 thereof mounted on it. A mortar dispensing means housing 26 is provided rearwardly of the motor and this is connected by a conduit 27 and a hose (not shown) to a source of cement mortar. The housing 26, together with a sleeve 28 on shaft 21, define a mortar chamber 29 into which the mortar is fed by conduit 27 and through which it passes before escaping through slots 30. A rotary mortar distributing head 31 is mounted upon the end of shaft 21 and includes the hub 32 and a plurality of plates 33 which extend radially and longitudinally of the machine in the region of the slots 30. A bearing 34 supports the hub on the tube 20 and indirectly supports the end of shaft 21. The mortar dispensing means operates in the customary way and need not be further described.

The drive shaft 21 extends into a gear housing 35 and is provided with a gear 36 which drives two power output shafts 37 and 38 through spur gears 39 and 40 thereon, respectively. Shaft 37 drives the main wheels 12 through the medium of a belt drive 41 (FIG. 1), shaft 42, gearbox 43, shaft 44, gearbox 45, and shaft 46. Any suitable means may be used in the drive train to engage and disengage the wheels 12.

Output power shaft 38 serves to drive the wire rod feed means 18 and such feed means may comprise any suitable mechanism for engaging and advancing the wire rod 51 so as to force it through the tube 20 with sufficient force to traverse the wire rod dispensing head 17 (yet to be described) and to coil such wire rod helically inside the pipeline as indicated by the coils 51c shown in FIG. 1. The wire rod feed means includes a plurality of drive rollers or wheels 50 having roughened peripheral surfaces and a plurality of idler rollers 51' associated therewith, the idler rollers being mounted upon spring-biased bell cranks 52 so as to cause the wire rod to be firmly gripped between each set of rollers. The drive train may comprise a gear 53 (FIG. 5) on the output shaft 38 meshing with a gear 54 on a shaft 55 extending from a gearbox 56. The latter may drive one wheel 50 on a shaft 57, while the remainder of the wheels 50 may be driven through chain drives 58, 59, and 60.

At the rear end of the tube 20 I mount the wire rod distributing head 17 which includes a mounting flange 65 which bolts to a hub 66 mounted on a bearing 67 on the shaft so that it may rotate relative thereto. A friction brake 68 is provided which includes a brake hub 70 having a plurality of holes 71 to receive pins 72 extending forwardly from a friction disk or plate 73 on which they are mounted. Each pin is fitted with a spring 74 which serves to yieldably urge the disk forward toward the surface 75 of the hub 66. Intermediate the plate and hub I provide a plurality of waved friction washers 76. A nut 77 and locknut 78 on the threaded end portion 79 of tube 20 serve to secure the bearing and hub 66 in place and also serve as a means of adjusting the tension or force and effectiveness of the brake.

The wire rod dispensing head 17 may take any of several forms and, for example, may be constructed like the one shown in Patent No. 2,996,085. However, in the present instance it is shown (FIGS. 1, 2, and 4) as comprising a doubly curved arm having an inner section 81 with substantially a 90° bend and an outer or end section 82 of about the same curvature. The sections 81 and 82 have integral flanges 83 and 84, respectively, which are bolted together so that the outer section can be so oriented that it curves about an axis which is normal to the axis of curvature of the inner section, less the helix angle of the coils to be wound. To enable adjustment, one of the flanges may be slotted circumferentially to receive the securing bolts 86. The inner section is made of two parallel curved plates 87 mounted in spaced relation by means of roller assemblies 88 which serve to guide the wire rod. The outer section is made up of the two parallel plates 89 and spacer guide roller assemblies 90 to guide the wire rod.

In the operation of the machine, as it moves through the pipeline under its own power in the direction of the arrow 15 (FIG. 1), a mortar coating 90 is applied to the interior surface of the pipeline by the mortar dispensing means 16. During this operation the wire rod 51 is fed through the machine by the wire rod feed means 18 and out through the rotatable head 17 and is thus coiled against the wall of the pipeline being embedded in the fresh mortar coating 92.

Although I have illustrated and described a preferred form of my invention, I contemplate that various changes and modifications can be made therein without departing from the invention, the scope of which is indicated by the following claims. Also, it should be noted that I provide a novel method of lining and reinforcing a pipeline wherein I apply a mortar coating and immediately thereafter coil the reinforcement rod in the applied coating while the coating is still soft. Subsequently a final coating of mortar is applied which covers the reinforcement coils, although this has not been shown in the drawings.

I claim:

1. In a machine for placing a mortar coating in a pipeline and helically coiling a reinforcement wire rod therein, a carriage adapted to traverse the pipeline, mortar dispensing means mounted on the carriage and including a rotary mortar head, means extending longitudinally through the mortar dispensing means and defining an open-ended passage from end to end thereof, a wire dispensing head means at the rear end of said passage and mounted for rotation about an axis coincident with that of the rotary mortar head, and powered wire rod feed means on said carriage at the front end of said passage adapted to feed a reinforcement wire rod through said passage to and through said wire rod dispensing head means.

2. In a machine for placing a mortar coating in a pipeline and helically coiling a reinforcement wire rod therein, a carriage adapted to traverse the pipeline, a stationary open-ended tube extending longitudinally of the carriage substantially on the axis of the pipeline, mortar dispensing means on the carriage around said tube, a wire rod dispensing head means mounted on said tube at the rear end thereof, and a power-driven wire rod feed means on said carriage at the front end of said tube adapted to feed a wire rod through said tube to and through said wire rod dispensing head means.

3. In a machine for placing a mortar coating in a pipeline and helically coiling a reinforcement wire rod therein, a wheeled carriage, a stationary open-ended tube extending longitudinally of the carriage, a motor on said carriage, a hollow shaft surrounding said tube, a mortar dispensing means on the carriage including a rotary mortar distributing head surrounding and driven by said shaft, a wire rod dispensing head carried on said tube rearwardly of said mortar distributing head, wire rod feed means on said carriage at the forward end of said tube adapted to feed a wire rod through said tube to and through the wire rod dispensing head, and a driving connection between said shaft and said wire rod feed means.

4. The machine set forth in claim 3 in which said wire rod dispensing head is so constructed and arranged as to rotate in reaction to the wire rod being fed therethrough and coiled in the pipeline, and in which a friction brake is mounted on said tube and resists rotation of said head.

5. The machine set forth in claim 3 in which at least one of the wheels of said wheeled carriage is driven by said shaft through an operable driving connection between the shaft and wheel.

6. In a machine for helically coiling a reinforcement wire rod in a pipeline, a carriage adapted to traverse the pipeline, a horizontal tube on said carriage, a wire rod dispensing head mounted for rotation on one end of said tube, power-driven means at the other end of said tube for feeding a wire rod through said tube to and through said wire rod dispensing head, said head being so constructed and arranged as to cause said head to rotate in reaction to the wire rod being fed therethrough and coiled in the pipeline, and a friction brake mounted on said tube and resisting rotation of said head.

7. The machine set forth in claim 6 in which a pipe coating dispensing means is provided intermediate the ends of said tube.

8. In a machine for placing a coating in a pipeline and helically coiling a reinforcement wire rod therein immediately thereafter, a carriage adapted to traverse the pipeline, a coating dispensing means mounted on the carriage, means extending longitudinally of the carriage to the front and rear of the coating dispensing means and defining an open-ended passage from end to end thereof, a wire dispensing head means at the rear end of said passage and mounted for rotation about an axis adapted to be made coincident with that of the pipeline, and powered wire rod feed means on said carriage at the front end of said passage adapted to feed a reinforcement wire rod through said wire rod dispensing head means.

9. In a machine for coating the inner surface of a pipeline with cement mortar and helically coiling a reinforcement wire rod in the coating, a carriage, a power-driven rotary mortar dispensing head on the carriage, power-driven means on said carriage for feeding the wire rod from in front of said mortar dispensing head to the rear thereof, and a wire rod dispensing head means to the rear of said mortar dispensing head including an inner member mounted on said support for rotation about a given axis designed to be made coincident with the axis of the pipeline, said wire rod being fed to said wire rod dispensing head means on said given axis, and an outer member mounted on said inner member, said members having guide means for leading the wire rod from said given axis through a curved path to a point adjacent the pipeline inner surface and at an angle such as required to produce the proper pitch of the helical coil to be wound.

10. The machine set forth in claim 9 in which said inner and outer members are each curved through about 90°, and in which the outer member is rotatably adjustable on the outer end of said inner member.

References Cited

UNITED STATES PATENTS

| | | | |
|---|---|---|---|
| 2,370,780 | 3/1945 | Crom | 242—7 |
| 2,917,820 | 12/1959 | Matheny | 29—401 X |
| 2,944,338 | 7/1960 | Craig | 29—460 X |
| 2,996,085 | 8/1961 | Matheny | 140—2 |
| 3,221,401 | 12/1965 | Scott et al. | 29—208 |

THOMAS H. EAGER, *Primary Examiner.*